United States Patent [19]

Lange

[11] Patent Number: 4,978,244
[45] Date of Patent: Dec. 18, 1990

[54] FASTENER APPARATUS

[75] Inventor: Fredric A. Lange, Osseo, Minn.

[73] Assignee: Interlock Structures International, Inc., Maple Grove, Minn.

[21] Appl. No.: 376,964

[22] Filed: Jul. 6, 1989

Related U.S. Application Data

[63] Continuation-in-part of Ser. No. 162,984, Mar. 2, 1988, abandoned.

[51] Int. Cl.$^5$ ............................................... F16D 1/00
[52] U.S. Cl. .................................... 403/379; 403/330; 285/397
[58] Field of Search ............... 403/330, 322, 292, 104, 403/378, 379; 285/397, 320, 311, 312

[56] References Cited

U.S. PATENT DOCUMENTS

| 799,176 | 9/1905 | Marble et al. | 285/397 X |
| 988,029 | 3/1911 | Prellwitz | 279/19.1 |
| 2,650,120 | 8/1953 | Kirkpatrick | 403/330 |
| 2,699,182 | 1/1955 | Baldridge, Jr. | 285/397 X |
| 3,024,031 | 3/1962 | Davidson | 403/379 X |

FOREIGN PATENT DOCUMENTS 2143700 3/1973 Fed. Rep. of Germany .
734513 8/1955 United Kingdom .

OTHER PUBLICATIONS

*Versatile Valco ® Snap Buttons* Catalog, Valco/Valley Tool & Die Company, North Royalton, Oh., May 11, 1987.

Primary Examiner—Andrew V. Kundrat
Assistant Examiner—J. Russell McBee
Attorney, Agent, or Firm—Merchant, Gould, Smith, Edell, Welter & Schmidt

[57] ABSTRACT

Fastener (22) connects an insert (24) to a hollow tube (26). Fastener (22) is formed to have a yoke portion (58) extending between a pair of arm portions (56), all of which are formed arcuately to conform to the shape of tube (26). Arm portions (56) have arcuate free ends. Arm portions (56) include protuberances (60) which then may be cammed between an engagement position with edges (34) of openings (30) in tube (26) and edges (44) of cavity space (40) in insert (24) and a disengageable position with edges (34) and (44).

17 Claims, 6 Drawing Sheets

FASTENER APPARATUS

This is a continuation-in-part of application Ser. No. 07/162,984 filed Mar. 2, 1988 now abandoned.

FIELD OF THE INVENTION

The present invention is directed generally to fasteners and, more particularly, to apparatus for connecting a hollow tube with an insert.

BACKGROUND OF THE INVENTION

The present invention is directed to the problem of bringing tubes together along a longitudinal or axial direction and connecting them together. In this regard, there are fastening devices which function after first moving the tubes in a transverse direction relative to one another. Many applications, however, do not allow for such movement. Even if they do, the connecting or fastening devices usually include end members having a larger transverse dimension than the transverse dimension of the tubes. Such bulky devices may not be desirable for either functional or aesthetic reasons.

Oftentimes, when tubes are moved longitudinally or axially, one is swedged to allow it to telescope into the other. Such interacting ends hold the tubes together in one axial direction, but not the other. A common positive attachment is obtained by then using a bolt and nut. Such attachment is simple, but the lines of the tubes are aesthetically broken.

No fastener is known which disengageably engages tubes together which are longitudinally or axially moved into engagement with one another and which fastener does not extend significantly from the profile of the tubes.

SUMMARY OF THE INVENTION

In a basic form, the present invention is directed to a fastener for connecting a hollow tube and an insert member. The hollow tube and insert member are aligned along a longitudinal axis. The hollow tube has an open end, while the insert member is formed to slide into the open end of the tube. The tube has a pair of openings in its wall with axially spaced first edges, while the insert member has cavity space in its wall with axially spaced second edges. Parts of the first and second edges are aligned. The fastener comprises a mechanism for engaging the first and second aligned edges and mechanism for levering the engaging mechanism between an engagement position with the first and second edges and a disengageable position with the first and second edges.

More particularly, the fastener includes a pair of plate-like arm portions each having an end with a partially arcuate perimeter. Each of said arm portions is also formed arcuately. Furthermore, each of the arm portions includes a protuberance which fits into one of the openings in the tube and into the cavity space in the insert member. The protuberances contact the aligned first and second edges of the openings and the cavity space to fasten the tube and the insert member together. The fastener also includes a yoke which is integral with the arm portions. The yoke is on one side of the tube and conforms to the tube.

In use, the yoke is grasped and rotated about the protuberances. The arcuate shape of the arm portions and of the perimeters of the ends of the arm portions cause an outward camming so as to retract the protuberances from the cavity space of the insert member. When the yoke is moved near the radial plane which passes through the centers of the protuberances, the fastener reaches the disengageable position where the protuberances are outwardly far enough that the insert member may be removed from the tube.

The present fastener is particularly advantageous since it fastens an insert member to a tube where the insert member is first moved axially into engagement with the tube, and the fastener, once completing the fastening, conforms generally to the profile of the tube thereby providing an aesthetically discreet connection. The fastener is exciting in this regard since the tube may be any of a variety of types, such as cylindrical, square, extruded, slotted, perforated, etc., and the insert may have a variety of configurations, such as a tube of smaller diameter, a tube of the same diameter with a swedged end, a solid member, etc. Furthermore, additional accessories or tubes can then be a part of or be further attached to the insert. In addition, multiple tube assemblies in the form of trusses can be fastened together and can be fastened together so as to include accessories, such as a flat plate between them.

Of further advantage is that in some embodiments the fastener comprises a single piece part. In spite of that, the fastener moves between engaging and disengageable positions. Furthermore, when it is in the disengageable position, it stays in position and does not fall from the tube.

The present fastener provides the added advantage of making a positive connection of a male/female relationship in a connection between similar parts. Furthermore, the parts may have a universal 360 degree circumferential alignment or may be made to have a positive single or multiple number of circumferential alignments.

The fastener functions from the outside of the tube, even though it forms a profile similar to the tube when it is in the fastening position. As a result, the insert may be solid or may be hollow. If it is hollow, wiring or various other items or even fluids may be passed through the connection.

Although the fastener and advantages have been thusly summarized, the preferred embodiments of the invention are further explained, and the advantages may be better understood, by reference to the following drawings and the detailed descriptive matter thereafter.

DETAILED DESCRIPTION OF THE PREFERRED EMBODIMENTS

Figures 1, 2, 3, 4:
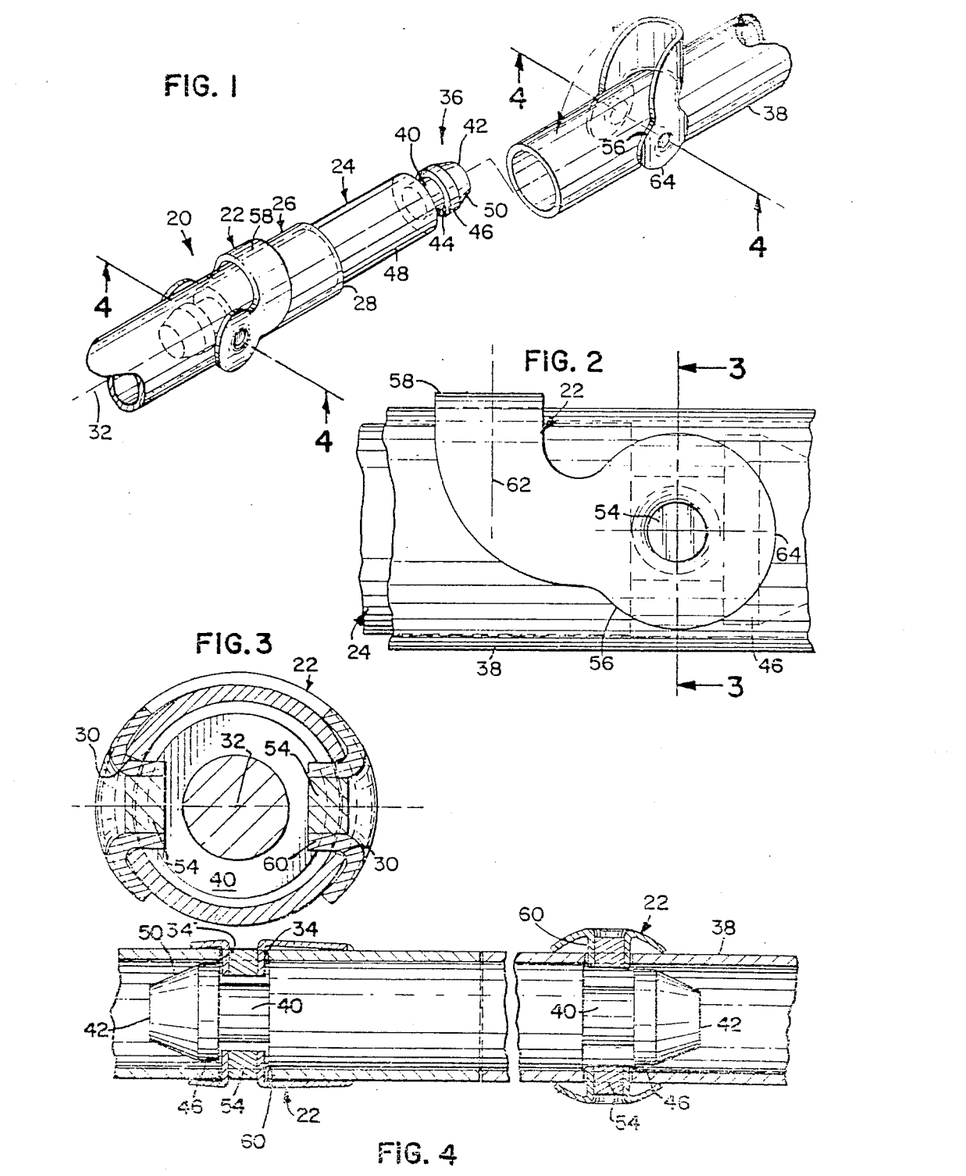
FIG. 1 is a perspective view of a first tube fastened to an insert in accordance with the present invention and of a second tube ready to be fastened to the insert.
FIG. 2 is a side view of the engaged fastener of FIG. 1.
FIG. 3 is a cross-sectional view taken along line 3—3 of FIG. 2.
FIG. 4 is a cross-sectional view taken generally along lines 4—4 of FIG. 1, with the insert shown to be inserted in the second tube.

Referring now to the drawings wherein like reference numerals designate identical or corresponding parts throughout the several views and wherein identical or corresponding parts on alternate embodiments are identified by the same reference numerals only primed, and referring more particularly to FIG. 1, connecting apparatus in accordance with the present invention is designated generally by the numeral 20. Connecting apparatus 20 includes a fastener 22 which releasably fastens an insert 24 to a tube 26.

Tube 26 is a longitudinal member which may have a variety of cross-sectional shapes, such as square, cylindrical, etc. It is also not necessary that the tube be completely enclosed. In the Figures, however, tube 26 is cylindrical and hollow. Tube 26 has an open end 28. A pair of openings 30 (see FIG. 3) are spaced a short distance from open end 28. Openings 30 are preferably centered on a line passing through the main axis 32 of tube 26. Openings 30 have axially spaced edges 34 (see FIG. 4).

Figure 13:
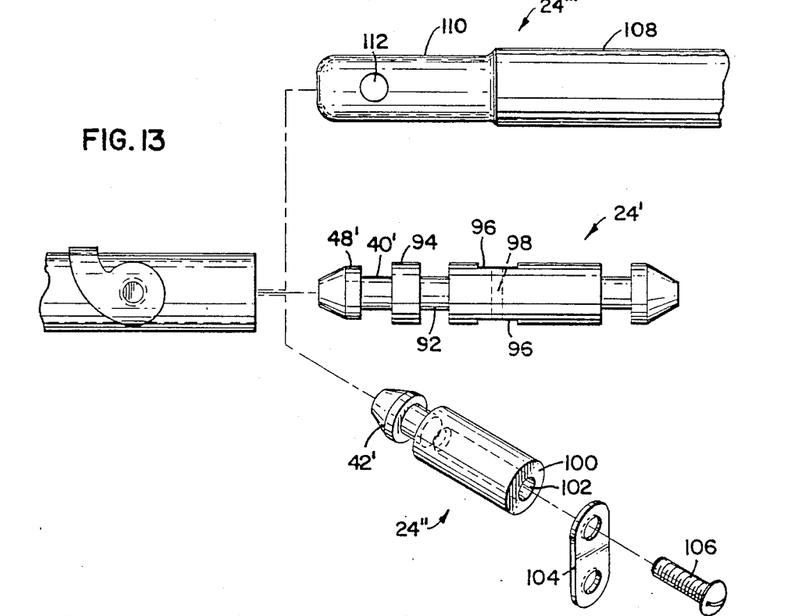
FIG. 13 is an exploded view of various inserts which may be used with the fastener of the present invention.

Insert member 24 may also have a variety of shapes, some of which are shown in FIG. 13, described below. In FIGS. 1-4 embodiment, insert 24 is a solid cylinder having a diameter only slightly smaller than the inside diameter of tube 26. Any end portion 36 which is to be connected with a tube 26, or equivalently a tube 38 as shown in FIG. 1, includes a cavity space 40 spaced a short distance from the end 42. Cavity space 40 is preferably annular and includes edges 44 which are axially spaced approximately the same distance as edges 34 of openings 30. Edges 44 are preferably sloped to encourage protuberances 60 (see FIG. 14) to slide off them and align with and engage space 40. Rounded corners 61 on the protuberances are also an aid in this regard. The important factor is that parallel walls of cavity space 40 and protuberances 60 engage to provide the locking function. The sloped edges and corners help to align parts and drive them together intially. They are also an aid when aligning multiple tubes of a truss to truss connection. The sloped corners in this case allow protuberances to ride up on one or more inserts while aligning the entire truss member. The sloped corners also aid the disengagement function. Between cavity space 40 and end 42, there is preferably a cylindrical portion 46 having a diameter somewhat less than the diameter of central portion 48 on the other side of cavity space 40. In this way, when fastener 22 is in the disengageable position, protuberances 60 still engage the inner edge 44 but not the outer edge 44 thereby preventing insert 24 from falling into the tube. Insert 24 has a beveled portion 50 between cylindrical portion 46 and end 42. In this way, insert 24 is formed to easily slide into the open end of a tube and cam protuberances 60 apart before they engage cavity space 40. When the insert is at least partially in a tube, both the insert and the tube are aligned generally along the main axis of the cylindrical shape of each.

Fastener 22 can include a pair of plugs 54 as shown in FIGS. 1-4. For some embodiments, as discussed hereinafter, plugs 54 are unnecessary. The primary member of fastener 22 is formed to have a pair of arm portions 56 and a yoke portion 58. A protuberance 60 is formed in each arm portion 56. A plug 54, when used, fits in and strengthens each protuberance 60.

In order to make a connection with the present apparatus, insert 24 is slid into open end 28 of tube 26 until the spaced-apart edges 34 of openings 30 and the spaced-apart edges 44 of cavity space 40 align. With fastener 22 installed on tube 26, protuberances 60 are engageable with the aligned edges 34 and 44. That is, fastener 22 is movable between an engagement position wherein insert 24 and tube 26 are fastened together and a disengageable position where insert 24 may be disengaged from protuberances 60 and pulled from tube 26. The engagement position is shown with respect to tube 26 in FIGS. 1 and 4. The disengageable position is shown with respect to tube 38 in FIGS. 1 and 4.

Fastener 22 is formed arcuately to conform to tube 26 when fastener 22 is in the engagement position. Since the yoke portion conforms to the cylindrical tube, it defines a yoke axis which is substantially the same as main axis 32. For purposes of definition, the protuberances 60 have centers located in a plane generally perpendicular to the yoke axis. The yoke portion 58 then has a centerline 62 which is perpendicular to the yoke axis. Centerline 62 is axially spaced with respect to the plane which includes the centers of protuberances 60.

Arm portions 56 extend generally in a direction parallel to main axis 32. Each arm portion 56 has an end 64 with the unconnected portion of its perimeter formed arcuately. For a reason which will become apparent, arcuate end 64 should include more than 180 degrees of an arc which is centered on protuberances 60.

The engagement mechanism of fastener 22 includes protuberances 60 as first elements. The disengagement mechanism of fastener 22 includes yoke portion 58 which extends generally in a direction perpendicular to the main axis, but which is integrally connected with the arm portions which extend generally in a direction parallel with the main axis. Since the arm portions 56 are formed arcuately to conform to tube 26 and since ends 64 have an arcuate perimeter, the arm portions 56 form second elements having on at least one side of the plane formed by main axis 32 and the centers of protuberances 60, cam surfaces which are curved with respect to a pair of orthogonal axes and which provide points on opposite sides of protuberances 60 which function as a fulcrum as yoke 58 is rotated about protuberances 60. That is, yoke 58 as connected with arm portions 56 becomes a lever pivoting on the indicated fulcrum to expand arm portions 56 away from tube 26 thereby moving protuberances 60 out of a position of positive engagement with at least one of edges 44 of insert 24. In other words, as yoke 58 is rotated about protuberances 60, the tube forming curvature of arm portions 56 cause points along the perimeters of opposite arm portions 56 to move from locations where they are nearer one another to locations where they are farther from one another. In so doing, arm portions 56 are sprung outwardly thereby pulling protuberances 60 outwardly. In this regard, fastener 22 must be made from a material which will allow arm portions 56 to spring outwardly, while at the same time retaining a memory so that they return to the original configuration when fastener 22 is returned to the engagement position from the disengageable position. Suitable materials include appropriate spring steels and appropriate plastics.

Protuberances 60 as shown in FIGS. 1-4 are extruded in arm portions 56 such that they are generally centered or in a concentric relationship with the arcuate perimeters of ends 64. The procedure for making a fastener 22 with an extruded protuberance includes first cutting an appropriate blank from flat sheet. An opening is drilled or formed at the center of where the protrusion is to be located. Then, an appropriate tool forms the extrusion so that protuberance 60 has a cylindrical side wall in integral attachment with arm portion 56, but does not have a complete bottom. Plugs 54 are inserted to provide strength in a direction transverse to the cylindrical axis of the protuberance. The plugs 54 may be fastened in a conventional way, such as friction, solder, etc. The arcuate curvature to conform lock member 52 with the shape of tube 26 is then accomplished. Finally, the material is heat treated.

Figures 10, 11, 12:
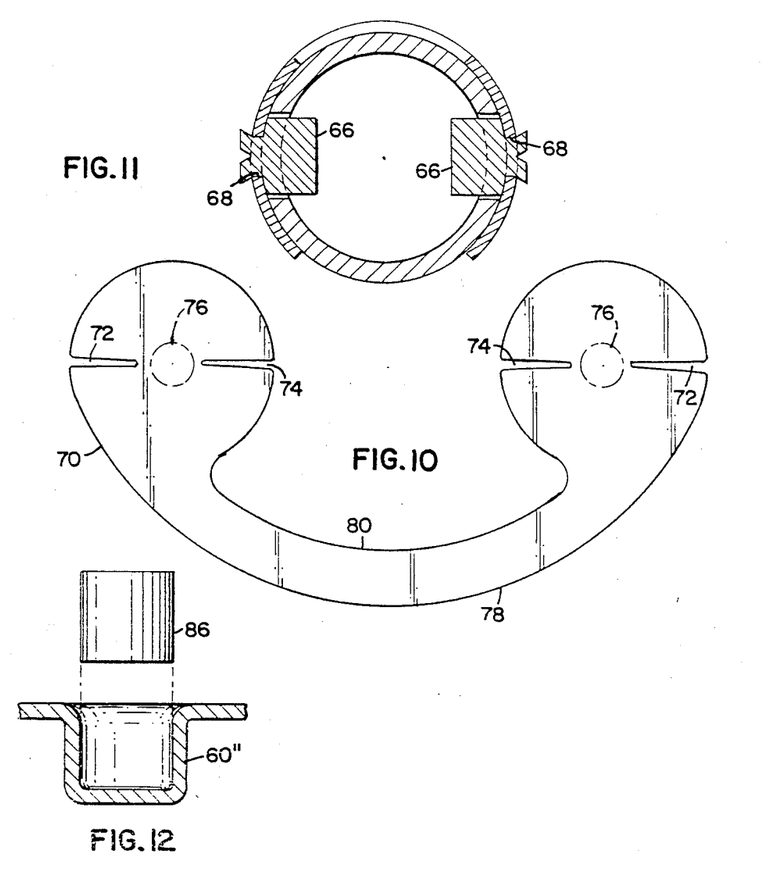
FIG. 10 is a plan view of a blank of the fastener of FIG. 9.
FIG. 11 is a cross-sectional view illustrating yet another alternate embodiment of a fastener in accordance with the present invention.
FIG. 12 is an exploded cross-sectional view of a portion of still another fastener in accordance with the present invention.

Alternatively, as shown in FIG. 11, rather than as extrude a protuberance in each arm portion, a rivet 66 may be attached at the opening 68 in each arm portion. The body of the rivet then forms the protuberance. The rivet may be installed during the manufacturing process either before the arcuate curvature is given to lock member 52 or after lock member 52 is formed and heat treated.

Figure 9:
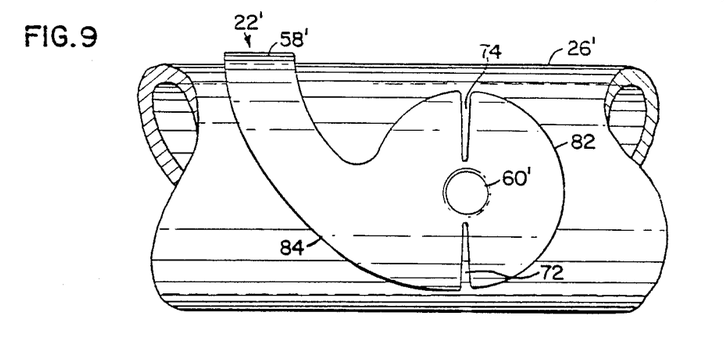
FIG. 9 is a side view of still another alternate embodiment of a fastener in accordance with the present invention.

As shown in FIGS. 9 and 10, fastener 22' may be formed so that a plug or rivet is not needed. Fastener 22' is formed from a blank 70. Blank 70 includes a pair of slots 72 and 74 on opposite sides of the center of where each protuberance will be located as indicated by the circular broken line 76. Slots 72 and 74 are generally aligned along a plane which includes the centers of the protuberances after they are formed, which plane is also approximately perpendicular with the yoke axis. Rather than being extruded, the protuberances in blank 70 are formed by a drawing process. That is, an appropriate tool forms the cup-like protuberance by drawing material into the protuberance thereby substantially closing slots 72. Thereafter, the blank is formed arcuately to conform to tube 26' and is then heat treated.

Figure 14:
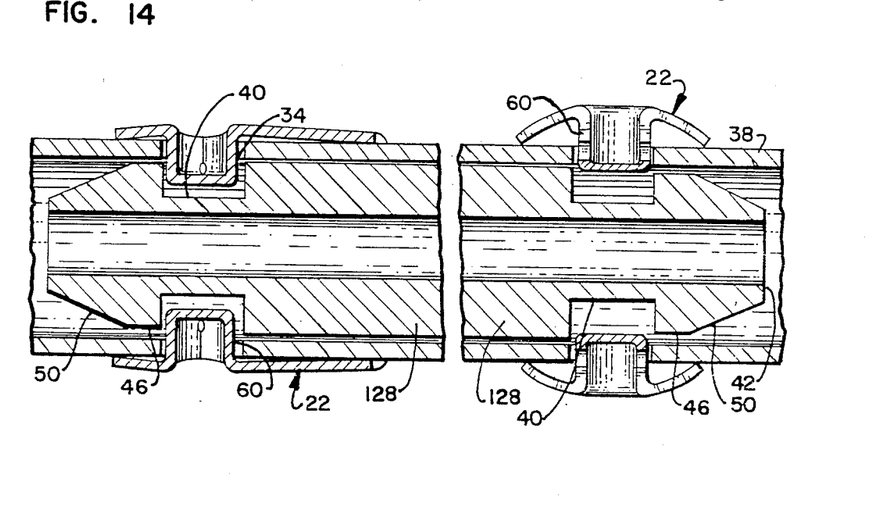
FIG. 14 is a cross-sectional view similar to FIG. 4, except the insert is shown to be hollow.

This forming method is particularly advantageous in that the protuberances are formed so that the facing walls of the protuberances in a completed fastener 22' have rounded corners 61 (see FIG. 14). The rounded corners were important so that, in contrast to a sharp edge catching on beveled portion 50, they simply slide on it and easily allow the beveled portion to cam a pair of protuberances apart.

It is observed that it is desirable to move protuberances in and out with respect to tube 26' by moving them generally along a chord line, usually a line through the main axis of tube 26', the protuberances moving between an engagement position and a disengageable position. In order to move the protuberances in this fashion, it is desirable that the edge 78 between slots 72 which are farthest from one another is as close in length as possible with edge 80 between slots 74 which are nearest one another. If this is the case, then as lever portion 58' is moved to the disengageable position, a point on each of cam surfaces 82 and 84 on each side of a line through a pair of slots 72 and 74 contacts tube 26' and provides approximately equal force in moving protuberance 60'. Also, protuberances 60' move generally straight along their centerlines rather than at an angle with respect to the engaged surfaces. Furthermore, if edge 80 is approximately the same length as edge 78, then yoke portion 58' will pass through the plane perpendicular to the yoke axis and including the centers of protuberances 60', to a stable disengageable position. If edge 80 is significantly shorter than edge 78, then fastener 22' may be frictionally held in the disengageable position, but the position will not be stable. Note that the points on cam surfaces 82 and 84 on each side of a line through a pair of slots 72 and 74 are also on each side of a plane which includes the main axis of tube 26' and the centerlines of the protuberances.

In a case where plastic is the material used for fastener 22, protuberance 60" may be molded without any slits or openings as shown in FIG. 12. In order to give the cup-like space greater strength, a metallic plug 86 is fastened in it.

Figure 5:
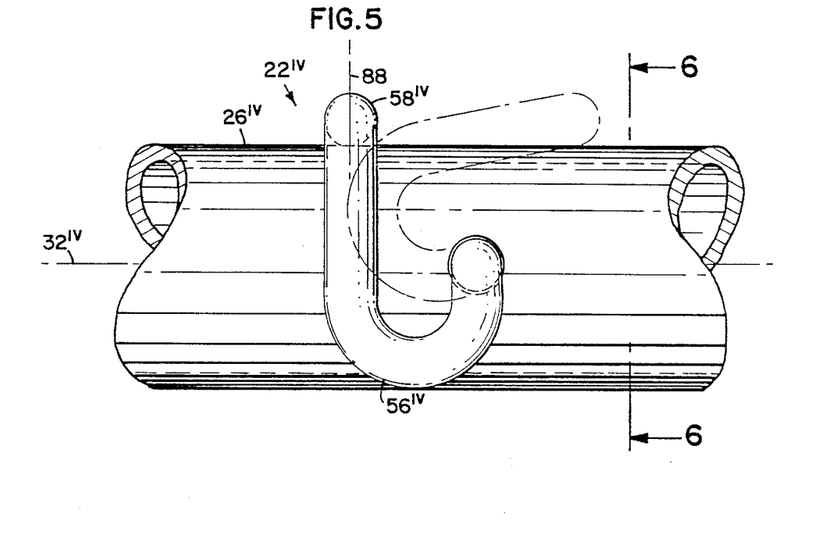
FIG. 5 is a side view of an alternate embodiment fastener in accordance with the present invention.
Figure 6:
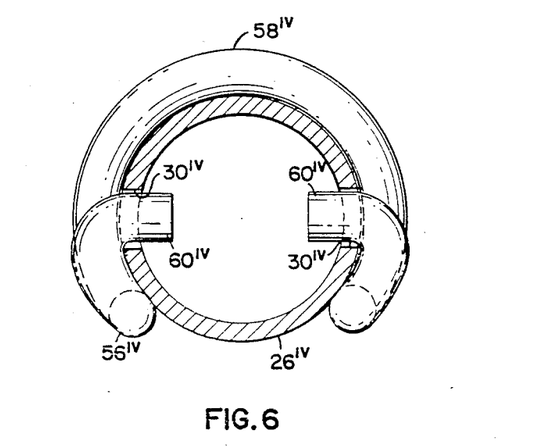
FIG. 6 is a cross-sectional view taken along line 6—6 of FIG. 5.

The alternate embodiment shown in FIGS. 5 and 6 shows a single piece fastener 22'''' made from wire or other rod-like material. Fastener 22'''' is formed to have a yoke portion 58'''' connecting integrally with arm portions 56'''' on opposite sides thereof. The ends of the rod-like material, are bent toward one another to form protuberances 60''''. For the embodiment shown, yoke portion 58'''', when it is in the engagement position, has a centerline 88 which is perpendicular to the main axis 32'''' of tube 26''''. Yoke portion 58'''' is formed arcuately to conform to the curvature of tube 26''''. Arm portions 56'''' smoothly proceed from yoke portion 58'''' to protuberances 60'''' at the ends. Openings 30' are on opposite sides of tube 26'''' with the centers being in the same plane as main axis 32''''. Yoke portion 58'''' is above that plane. Arm portions 56'''' are below that plane and have a U-like shape as viewed from the side. Arm portions 56'''' are also formed arcuately to conform with the curvature of tube 26''''. Protuberances 60'''' are bent at approximately right angle from arm portions 56''''. Protuberances 60'''' extend toward one another sufficiently far so that they engage the edges of the cavity space of the insert when fastener 22'''' is in the engagement position, but yet can be retracted so that they are disengageable from the cavity space of the insert when fastener 22'''' is in the disengageable position, as shown in broken lines in FIG. 5.

The contact surface of arm portions 56'''' with tube 26'''' forms, the camming surface for springing protuberances 60'''' outwardly when fastener 22'''' is moved from the engagement position to the disengageable position. As with each of the embodiments of the fastener of this invention, this occurs because the curvature of the arm portions is moved from a position conforming with the curvature of the tube to a position where the axis of the curvature of the yoke and arm portions forms an angle with the axis of the curvature of the tube.

Figure 7:
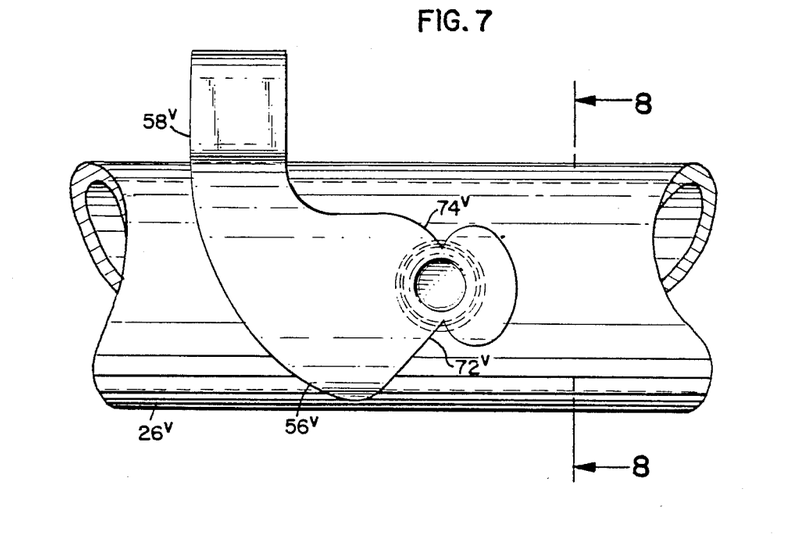
FIG. 7 is a side view of another alternate embodiment of a fastener in accordance with the present invention.
Figure 8:
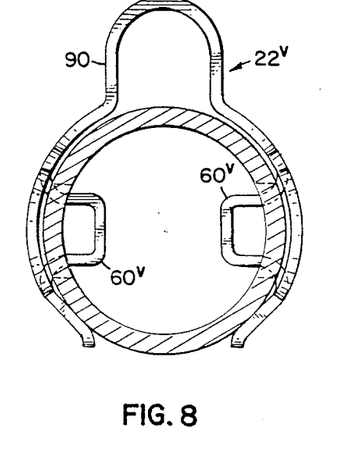
FIG. 8 is a cross-sectional view taken along line 8—8 of FIG. 7.

The embodiment of FIGS. 7 and 8 illustrates a fastener 22''''' which includes protuberances 60''''' which are formed by a drawing procedure similar to that described with respect to fastener 22'. The arm portions 56'''''' extend downwardly from the center of protuberances 60'''''' and toward yoke portion 58'''''' so that the camming surface which is formed on the yoke portion side of slot 72'''''' is at a greater distance from the center of protuberance of 60'''''' than the camming surface on the side opposite yoke portion 58'''''' of slot 74''''''. Another feature of fastener 22'''''' is the inverted U-like handle 90 formed in a central region of yoke portion 58'''''' between arm portions 56''''''. Handle 90 extends away from tube 26'''''' so that fastener 22'''''' may be more easily grasped and moved between the engagement and disengageable positions.

Numerous embodiments of the fastener in accordance with the present invention have been presented. The various embodiments are advantageous in that they show the fastener can be made using a variety of procedures, including extruding the protuberance, drawing the protuberance, forming the protuberance with a rivet, making the fastener from plastic and reinforcing the protuberance with a metallic plug. Features which are common to all of the embodiments include the yoke portion spaced axially from the protuberances, as well as the curved perimeters and conforming curvature with the tube of the arm portions which then provide moving fulcrums along camming surfaces which function to withdraw the protuberances from engagement with edges of cavity space in the insert of the tube when the fastener is moved from an engagement position to a disengageable position.

Various alternate embodiment inserts are illustrated in FIG. 13. Insert 24' is shown to include not only a first annular cavity space 40', but also a second annular cavity space 92. There could, of course, be even more such spaces. In this way, various depths of insertion into the tube are possible. It is noted that the cylindrical portion 94 between the two annular spaces must have the diameter of cylindrical portion 48' so that disengagement is not too difficult if the protuberances of the fastener are not retracted completely within the wall of the tube. A further feature of insert 24' is the flats 96 formed in a region between the opposite ends. A threaded opening 98 is shown extending between flats 96. The threaded opening and flat may be used to attach an accessory, the accessory being locatable in the region between connecting tubes.

Insert 24" is essentially one-half of insert 24. The end 100 opposite end 42' which is formed for use with a fastener in accordance with the present invention includes a tapped opening 102 to which an accessory, such as a hanger 104, may be fastened with a screw 106. It is also clear that if a threaded rod were used instead of screw 106, that a second insert 24" could be attached on the opposite side of hanger 104 from the first insert 24" thereby illustrating how a hanger accessory can be attached between connecting tubes in accordance with this invention (see also FIG. 16). Insert 24''' is a tube 108 having a swedged end 110. End 110 includes a pair of openings 112 opposite from one another and formed to align with the openings in the connecting tube so that the protuberances of the fastener may fit therein. It is noted that the cavity space of insert 24''' are openings 112, rather than an annular space. Openings 112 thus provide a positive rotational fastening if that is desired, while an insert such as 24' with an annular cavity space 40' provides a connection regardless of the rotational orientation of insert 24'. It is further noted that insert 24''' is hollow so that wires or other materials can be conveniently passed through the connection. It is noted that others of the various insert embodiments could also be hollow (see for example FIG. 14).

All the embodiments of fasteners and inserts are used similarly. With reference to the embodiment of FIGS. 1-4, however, initially, a fastener 22 is installed on tube 26 so that protuberances 60 fit in openings 30. Fastener 22 is rotated in a first direction about protuberances 60 to the disengageable position as shown with respect to tube 38 in FIG. 1. An insert 24 is then slid into the open end of the tube until the edges 44 of cavity space 40 align with edges 34 of openings 30. Fastener 22 is then rotated in the direction opposite to the first direction so that it moves from the disengageable position to the engagement position. In the engagement position, the protuberances fit into openings 30 and cavity space 40 to positively connect insert 24 to tube 26.

Insert 24 is disengaged from tube 26 by rotating fastener 22 again in the first direction to the disengageable position. Insert 24 is then pulled from the end of the hollow tube.

Alternatively, it is noted that the shape and material of fastener 22 allow it to deform so as to spring protuberances 60 apart. With this in mind, an insert 24 may be installed simply by inserting it with some force so that protuberances 60 ride up on and are cammed outwardly by beveled portion 50. Thus, for installation purposes, it is unnecessary to move fastener 22 into the disengageable position.

Figures 15, 16:
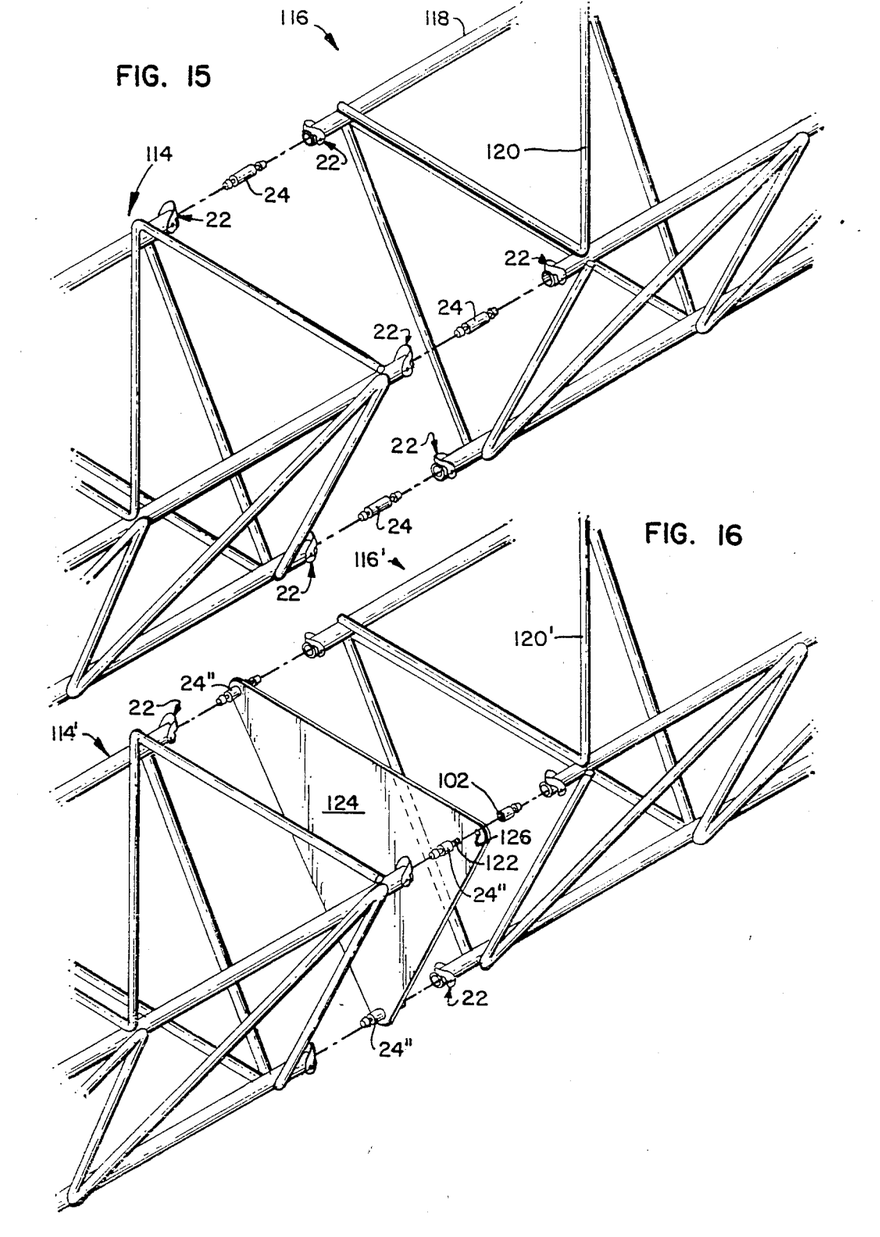
FIG. 15 is an exploded perspective view of a pair of triangular trusses which may be fastened together in accordance with the present invention.
FIG. 16 is similar to FIG. 15 except the inserts are formed in two parts so as to receive a plate between them.

Further applications of the present invention are shown in FIGS. 15 and 16. In FIG. 15, first and second truss members 114 and 116 are shown with each tube 118 connected together in the fashion of FIG. 1. The various tubes 118 are interconnected by webbing 120. In this way, the tubes are held spaced-apart and are held to extend longitudinally in an approximately parallel fashion.

In FIG. 16, truss members 114' and 116' are connected together using inserts 24" with a threaded rod 122 threaded into each threaded opening 102 (see FIG. 13) of the facing ends of inserts 24". Plate 124 includes openings 126 which can receive threaded rods 122 therethrough to thereby hold plate 124 between inserts 24" and, consequently, between trusses 114' and 116'. It is understood that plate 124 may have any thickness and a variety of shapes.

Thus, the fastener of the present invention has been described in the form of a variety of embodiments. Nevertheless, it is understood that the disclosure is conceptual and that further equivalents are possible. Consequently, in the spirit of the present invention, any changes made, especially in matters of shape, size, and arrangement of parts to the full extent extended by the general meaning of the terms in which the appended claims are expressed, are within the principle of the invention.

What is claimed is:

1. A fastener for connecting a hollow tube having a first wall and an insert member having a second wall, said hollow tube and said insert member being aligned along a main axis, said hollow tube having an open end, said second wall of said insert member being formed to slide into the open end of said tube, said first wall having a pair of openings with axially spaced first edges and said second wall having cavity space with axially spaced second edges, parts of said first and second edges being aligned, said fastener comprising means for engaging said first and second aligned edges and means for levering said engaging means between an engagement position with said first and second edges and disengageable position with said first and second edges, said engaging means including first elements having centers which are in a plane with said main axis and wherein said levering means includes a second element having a surface on each side of said plane which is arcuate with respect to a pair of orthogonal axes, said surfaces having spaced portions contacting said hollow tube at spaced-apart locations when said engaging means is in said disengageable position.

2. The fastener in accordance with claim 1 wherein said levering means includes a plate-like member formed to have a pair of arm portions and a yoke portion connecting said arm portions, said arm portions extending generally in a direction parallel to the main axis, said yoke portion extending generally in a direction perpendicular to the main axis, said engaging means including a protuberance formed in each of said arm portions, each of said protuberances forming a cup-like space, said fastener including a metallic insert fastened in each of said cup-like spaces.

3. A fastener for connecting a hollow cylindrical tube having a first wall and an insert member having a second wall, said second wall of said insert member being formed to slide into said tube, said first wall having a pair of aligned openings, said openings having axially spaced first edges, said second wall having cavity space with axially spaced second edges, parts of said first and second edges being aligned, said fastener comprising a pair of plate-like arm portions each having an end with a partially arcuate perimeter, each of said arm portions being formed arcuately to curve around some of said tube, each of said arm portions including a protuberance fitting into one of said openings and said cavity space to contact said aligned first and second edges to fasten said tube and said insert member together, said protuberances having facing walls with rounded corners at edges thereof, said fastener further including means connected between said arm portions for moving said protuberances outwardly with respect to said cavity space and said openings to allow said insert member to be unfastened with respect to said tube.

4. A fastener for connecting a hollow cylindrical tube having a first wall and an insert member having a second wall, said second wall of said insert member being formed to slide into said tube, said first wall having a pair of aligned openings, said openings having axially spaced first edges, said second wall having cavity space with axially spaced second edges, parts of said first and second edges being aligned, said fastener comprising a pair of plate-like arm portions each having an end with a partially arcuate perimeter, each of said arm portions being formed arcuately to curve around some of said tube, each of said arm portions including a protuberance fitting into one of said openings and said cavity space to contact said aligned first and second edges to fasten said tube and said insert member together, each of said arm portions including a slot therein on opposite sides of each of said protuberances, said fastener further including means connected between said arm portions for moving said protuberances outwardly with respect to said cavity space and said openings to allow said insert member to be unfastened with respect to said tube.

5. The fastener in accordance with claim 4 wherein said moving means includes a yoke integral with said arm portions, said yoke having first and second opposite edges running between said slots which are on opposite sides of each of said protuberances, said first and second edges being of generally similar length.

6. Connecting apparatus, comprising: a hollow cylindrical tube having a first wall and an open end, said first wall having a pair of openings aligned along a chord in a cross-sectional plane of said tube;
a cylindrical insert member having a second wall formed to slide into the open end of said hollow tube, said second wall having an annular slot with axially spaced second edges, portions of said first and second edges being aligned; and
a fastener member including a pair of protuberances and means for moving said protuberances generally along said chord line between an engagement position with said first and second edges and a disengageable position with said first and second edges.

7. Apparatus in accordance with claim 6 wherein said insert member includes an axial passageway.

8. The apparatus in accordance with claim 6 wherein said fastener member is formed to have a pair of arm portions and a yoke portion connecting said arm portions, said tube having an axis, said arm portions extending generally in a direction parallel to the tube axis, said yoke portion extending generally in a direction perpendicular to the tube axis, each of said arm portions including one of said protuberances, said fastener member being plate-like and said arm portions being arcuately formed to each have a pair of spaced-apart points in contact with said tube when said yoke portion is moved to lever said protuberances between engagement and disengageable positions.

9. The apparatus in accordance with claim 6 wherein said annular slot divides said insert member into leading and trailing portions, said leading portion having a smaller diameter than said trailing portion so that said protuberances can disengage with respect to one direction and not another.

10. The fastener in accordance with claim 6 wherein said annular slot includes leading and trailing top edges, said edges being sloped to encourage said protuberances to align with and engage said slot.

11. A method for using fastening apparatus, comprising the steps of:
installing a fastener member to a hollow tube, said fastener member having a pair of arm portions and a yieldable yoke portion connecting said arm portions, each of said arm portions including a protuberance, said hollow tube including a first wall with a pair of openings in said first wall, said protuberances fitting in said openings;
inserting an insert member into an end of said hollow tube, said insert member having a second wall formed to slide into said tube, said second wall having cavity space; expanding said protuberances apart with said insert member; and
allowing said protuberances to move toward one another again and fit into said openings in said tube and said cavity space in said insert member.

12. The method in accordance with claim 11 including rotating said fastener member about said protuberances to a disengageable position and pulling said insert member from the end of said hollow tube.

13. Connecting apparatus, comprising:
first and second longitudinally-extending, hollow tubes having first walls and first open ends, each of said first walls having a pair of openings;

a pair of fastener member each having protuberances fitting in one of the pairs of openings in one of said first walls, each of said fastener members including means for resiliently connecting a pair of said protuberances together; and an insert member having a second wall formed to slide longitudinally into the first open ends of said tubes, said insert member including means for moving said pair of connected protuberances of each of said fastener members and means for receiving said protuberances so that said protuberances can engage said tubes and said insert member.

14. Apparatus in accordance with claim 13 wherein said moving means includes an inclined end on said insert member.

15. Apparatus in accordance with claim 13 wherein each of said insert member includes first and second parts and means for holding said first and second parts together, said holding means including means for supporting an accessory extending transversely from said insert member.

16. Apparatus in accordance with claim 15 wherein said holding means includes threaded openings in facing ends of said first and second parts and a threaded rod received in each of said openings.

17. Apparatus in accordance with claim 16 wherein said accessory is a plate having unthreaded openings for receiving said threaded rods in regions between said first and second parts.

* * * * *